April 27, 1948.  G. R. FURMAN  2,440,369
AUTOMOTIVE BATTERY HEATING SYSTEM
Filed July 29, 1944

INVENTOR
GEORGE R. FURMAN.
BY
ATTORNEY

Patented Apr. 27, 1948

2,440,369

UNITED STATES PATENT OFFICE 2,440,369

AUTOMOTIVE BATTERY HEATING SYSTEM

George R. Furman, Beacon, N. Y., assignor to The Texas Company, New York, N. Y., a corporation of Delaware Application July 29, 1944, Serial No. 547,233

5 Claims. (Cl. 123—142.5)

This invention relates to batteries and more particularly to a method and apparatus for supplying heat to a battery to increase its operating efficiency in cold weather and to enable it to take a charge during periods of operation of the automotive vehicle in which it is installed.

Storage batteries used in motor vehicles and particularly those which are used in excessively cold climates ordinarily will not yield sufficient current to operate the engine starting motors when temperatures below −20° F. are encountered. Furthermore, a battery ordinarily will not build up a charge during a period of operation of the vehicle if the battery temperature is below 30 F. Accordingly, it is an object of the present invention to provide a system of battery heating which will insure maximum battery efficiency both from the standpoint of engine starting and the recharging of the battery during the periods of operation of the vehicle. It is a further object of the invention to provide an apparatus which can be installed on existing automotive equipment with a minimum of difficulty and without making any radical changes in the automotive assembly.

The invention contemplates the provision of means for warming the engine coolant and the means may include a gasoline burning or electric engine heater designed for installation under the hood of a motor vehicle. An electrical heating unit is employed in preference to a gasoline burning heater wherever electricity is available in sufficient quantity, either in the form of storage batteries or from a commercial power line. Whatever the character of the heater, it is so constructed and arranged that liquid coolant from the jacketed engine cylinder block is heated and returned to the jacket by thermo-siphoning and according to the present invention some of the engine coolant is by-passed after it has been warmed by the heater and introduced into a heat exchanger in the form of a pad or coil which is disposed beneath the battery of the car. The coolant passing through the heat exchanger gives up some of its heat and thereafter is returned to the system for further circulation with the main body of the coolant, while the heat given up passes to the battery and raises the temperature of the liquid therein.

The invention is adapted for use with any type of vehicle but is particularly intended for use with vehicles in which the battery is located outside of the engine compartment as, for example, on the running board of the vehicle.

Figure 1:
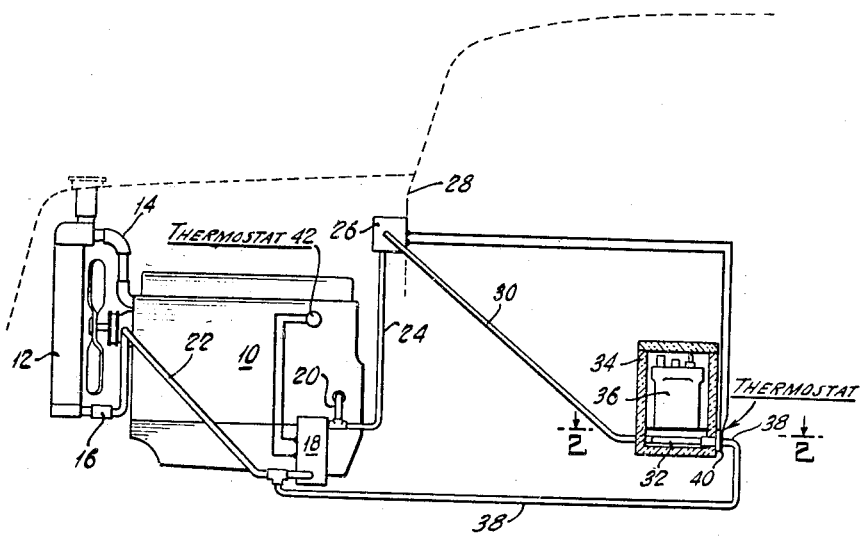

Other objects, features and advantages of the invention will appear as the description thereof progresses, particularly when read in connection with the accompanying drawings in which, Figure 1 is a view in elevation, partly in section, of an apparatus constructed in accordance with the present invention and constituting an embodiment thereof.

Figure 2:
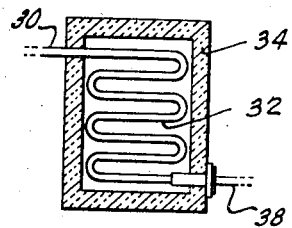

Figure 2 is a sectional plan view taken on line 2—2 of Figure 1.

In the drawing there is illustrated so much of a typical motor vehicle as is necessary to an understanding of the present invention. As shown in Figure 1, an engine cylinder block 10, which is provided with the usual water jackets (not shown), is connected to a radiator 12 in a conventional manner by means of upper and lower connecting hoses 14 and 16, respectively. In order to provide for warming the engine coolant to insure easier starting when excessively low temperatures are encountered a heater 18, which for purposes of illustration will be described as an electric heater containing an electrically heated element (not shown) and which is adapted to be supplied with electricity from any convenient source, is connected with the engine coolant system by means of a pipe 20 through which the heated coolant enters the lower portion of the cylinder block 10, and a pipe 22 through which the coolant is returned from the upper portion of the block to the heater 18 wherein the coolant is passed in heat exchange relation with the electrically heated element. Heat supplied by the heater 18 causes the engine coolant to flow by thermo-siphon action into the engine jacket space where it gives up its heat to the engine block 10

In order to provide heat for warming the battery to improve its starting efficiency and increase its charging rate, a pipe 24 connects at one end with the pipe 20 between the heater 18 and the cylinder block 10. The opposite end of the pipe 24 connects with the inlet side of an electric pump 26 which for convenience may be located on the inside of the instrument board 28 of the vehicle. Another pipe 30 connects at one end with the outlet side of the pump 26 while its opposite end connects with the inlet end of a coil, pad or tank 32, hereinafter referred to as coil 32, which is disposed in an insulated housing 34 in which the battery 36 is enclosed. Still another pipe 38 connects at one end with the outlet end of the coil 32 and at its other end connects with pipe 22 near the inlet to the heater 18.

From the foregoing it will be seen that while the heater 18 is in operation as it ordinarily would be when the vehicle is standing by in cold climates, the engine coolant within the heater 18 rises therefrom as it is warmed and passes to the jacketed cylinder block 10 in which it is circulated until it returns again to the heater. During the same standby periods it is generally desirable to warm the battery 36 and to accomplish this it is only necessary to start the electric pump 26. By so doing some of the heated coolant is by-passed as it leaves the heater 18 and passes through the pipes 28 and 30 to the coil 32 wherein the coolant gives up its heat to the battery 36, the coolant then returning through pipe 38 to the heater 18.

Obviously it is important that the battery shall not be overheated and to prevent any such occurrence a thermostat 40 is arranged in concurrence with the coil 32 and adjusted to stop the operation of the pump 26 by opening the electric circuit through which power is supplied to the pump when the coil temperature reaches a predetermined upper limit. When operation of the pump 26 is discontinued additional coolant is no longer circulated through the coil 32 until the temperature of the liquid remaining therein again drops to a predetermined lower limit when operation of the pump 26 and circulation of the coolant through the coil 32 is resumed, the operation of the pump being again started by the action of the thermostat in closing the electrical circuit. Similarly, operation of the electric heater 18 may be controlled by a thermostat 42 which is preferably located in the upper portion of the cylinder block 10 and which controls the passage of electricity to the heater.

Obviously many modifications or variations of the invention as herein described may be made without departing from the spirit and scope thereof and therefore only such limitations should be imposed as are indicated in the appended claims.

I claim:

1. The method of heating the storage battery of a motor vehicle which comprises circulating heated liquid through the cooling system of the vehicle engine, by-passing some of said heated liquid from said cooling sysem and circulating it in heat exchange relation with the casing of said battery, and interrupting the by-passing of said heated liquid to the heat exchanger when the temperature of the liquid in the heat exchanger exceeds a predetermined limit.

2. The method of heating the storage battery of a motor vehicle which comprises continuously circulating heated liquid from the cooling system of the vehicle engine in heat exchange relation with the casing of said battery, and automatically stopping the circulation of said heated liquid when the temperature thereof exceeds a predetermined limit.

3. The combination with a motor vehicle having an engine with a water jacketed cylinder block, a heater for heating the water in said water jacket during standby periods and a battery for starting said engine, of means for heating said battery during standby periods to insure maximum power output when starting the engine comprising a chambered heat exchanger disposed in contact with said battery and means for circulating heated water from said heater through said heat exchanger.

4. The combination with a motor vehicle having an engine with a water jacketed cylinder block, a heater for heating the water in said water jacket during standby periods and a battery for starting said engine, of means for heating said battery during said standby periods to insure maximum power output when starting the engine, comprising a heat exchanger coil disposed in contact with said battery, means connecting said heater and said coil to provide for circulation of heated water from said heater through said coil, and means for pumping heated liquid through said water circulating means.

5. The combination with a motor vehicle having an engine with a water jacketed cylinder block, a heater for heating the water in said water jacket during standby periods and a battery for starting said engine, of means for heating said battery during said standby periods to insure maximum power output when starting the engine, comprising a heat exchanger coil disposed in contact with said battery, means connecting said heater and said coil to provide for circulation of heated water through said coil, means for pumping heated liquid through said water circulating means, and temperature responsive means operatively connecting said coil and said pumping means for controlling the actuation of the latter in response to changes in the temperature of the water in said coil.

GEORGE R. FURMAN.

REFERENCES CITED

The following references are of record in the file of this patent:

UNITED STATES PATENTS

| Number | Name | Date |
|---|---|---|
| 1,155,599 | Metcalf | Oct. 5, 1915 |
| 1,357,598 | Thompson | Nov. 2, 1920 |
| 1,363,889 | Linebarger | Dec. 28, 1920 |
| 1,493,773 | Dorion | May 13, 1924 |
| 1,543,820 | Belden | June 30, 1925 |
| 1,927,554 | McCleery | Sept. 19, 1933 |
| 2,277,598 | McCollum | Mar. 24, 1942 |
| 2,286,854 | Holthouse | June 16, 1942 |
| 2,319,422 | Maihack | May 18, 1943 |

FOREIGN PATENTS

| Number | Country | Date |
|---|---|---|
| 218,980 | Switzerland | 1942 |